United States Patent
Yellin et al.

(10) Patent No.: US 12,130,588 B2
(45) Date of Patent: Oct. 29, 2024

(54) SYSTEM AND METHOD FOR OBJECT DETECTION IN HOLOGRAPHIC LENS-FREE IMAGING BY CONVOLUTIONAL DICTIONARY LEARNING AND ENCODING WITH PHASE RECOVERY

(71) Applicant: miDiagnostics NV, Heverlee (BE)

(72) Inventors: Florence Yellin, Baltimore, MD (US); Benjamin D. Haeffele, Oakland, CA (US); Rene Vidal, Baltimore, MD (US)

(73) Assignee: miDiagnostics NV, Heverlee (BE)

( * ) Notice: Subject to any disclaimer, the term of this patent is extended or adjusted under 35 U.S.C. 154(b) by 356 days.

(21) Appl. No.: 17/767,959

(22) PCT Filed: Oct. 13, 2020

(86) PCT No.: PCT/IB2020/000852
§ 371 (c)(1),
(2) Date: Apr. 11, 2022

(87) PCT Pub. No.: WO2021/069973
PCT Pub. Date: Apr. 15, 2021

(65) Prior Publication Data
US 2023/0343115 A1    Oct. 26, 2023

Related U.S. Application Data

(60) Provisional application No. 62/914,405, filed on Oct. 11, 2019.

(51) Int. Cl.
*G06V 20/69* (2022.01)
*G03H 1/04* (2006.01)
(Continued)

(52) U.S. Cl.
CPC ......... *G03H 1/0443* (2013.01); *G06V 10/147* (2022.01); *G06V 10/751* (2022.01);
(Continued)

(58) Field of Classification Search
CPC ......... G03H 1/0443; G03H 2001/0447; G06V 10/147; G06V 10/751; G06V 20/69; G06V 20/693; G06V 20/698
See application file for complete search history.

(56) References Cited

U.S. PATENT DOCUMENTS

| | | | |
|---|---|---|---|
| 2014/0313551 A1* | 10/2014 | Lyren | H04N 1/00167 358/1.18 |
| 2017/0322516 A1* | 11/2017 | Hsiao | G03H 1/0866 |

FOREIGN PATENT DOCUMENTS

| | | |
|---|---|---|
| WO | 2018/085655 A1 | 5/2018 |
| WO | 2018/085657 A1 | 5/2018 |

OTHER PUBLICATIONS

Latychevskaia, T, et al., Reconstruction of purely absorbing, absorbing and phase-shifting, and strong phase-shifting objects from their single-shot in-line holograms, Applied Optics, May 1, 2015, vol. 54, No. 13, pp. 3925-3932.

* cited by examiner

*Primary Examiner* — Chuong A Ngo
(74) *Attorney, Agent, or Firm* — Hodgson Russ LLP

(57) ABSTRACT

Systems and methods for detecting objects in a holographic image are provided. The techniques include obtaining a holographic image having one or more objects depicted therein. A set of object templates is obtained. The set of object templates represents objects to be detected in the holographic image. One or more objects are detected in the holographic image using the set of object templates by iteratively computing a phase ($\theta$) of the optical wavefront at
(Continued)

the hologram plane, background illumination (μ). and encoding coefficients (A) for the set of object templates, until converged.

14 Claims, 5 Drawing Sheets

(51) Int. Cl.
    *G06V 10/147*     (2022.01)
    *G06V 10/75*     (2022.01)
(52) U.S. Cl.
    CPC ............ *G06V 20/69* (2022.01); *G06V 20/693* (2022.01); *G06V 20/698* (2022.01)

SYSTEM AND METHOD FOR OBJECT DETECTION IN HOLOGRAPHIC LENS-FREE IMAGING BY CONVOLUTIONAL DICTIONARY LEARNING AND ENCODING WITH PHASE RECOVERY

CROSS-REFERENCE TO RELATED APPLICATIONS

This application claims priority to U.S. Provisional Application No. 62/914,405, filed on Oct. 11, 2019, the disclosure of which is incorporated herein by reference.

FIELD OF THE DISCLOSURE

The present disclosure relates to holographic images, and in particular, object detection in holographic imaging.

BACKGROUND OF THE DISCLOSURE

Lens-free imaging has gained popularity in recent years in the biomedical imaging community, due to its ability to produce wide field of view images for a given magnification with minimal hardware requirements and low cost. Holographic images are acquired by illuminating a specimen with a coherent light source, and the resulting diffraction pattern (hologram) is recorded on an image sensor. The distance between the object (specimen) plane and the hologram (sensor) plane is known as the focal depth, which can vary between experiments due to small shifts in the experimental setup. Recently, the ability to record holographic images of blood cells and use these images to produce an estimate of a sample's cell concentration, has emerged as a promising application for lens-free imaging. Key to estimating cell concentrations from holographic images is being able to accurately detect objects in such images.

One unique challenge associated with object detection in holograms is that as the signals from individual cells propagate from the object plane to the hologram plane, they interact through a non-linear diffraction process, which is especially apparent in high concentration samples (FIG. 1, bottom left). Thus, traditional methods for detecting cells in images, such as convolutional methods, are bound to fail if applied directly to holograms of high-cell-concentration blood samples. This is highlighted in previous research, where the authors attempted to count blood cells directly from holograms via a correlation-based method and observed that they could only accurately count cells in low-concentration samples. Furthermore, when using such a method, a large training dataset obtained from multiple depths of focus would be necessary, since the focal depth at testing typically cannot be exactly controlled experimentally. As with many biomedical applications, obtaining data can be expensive, and available training data may be limited.

To address these challenges, some methods for counting objects in holograms rely on a two-step process. First, the holographic image is reconstructed into an image of the object plane. Then, standard object detection methods can be used to detect cells in the reconstructed image. If the reconstruction quality is sufficient, a simple object detection method such as thresholding can reliably be used. While this two-step approach is promising, it has disadvantages. For example, the focal depth is typically known only approximately, due to experimental variance. If the object detection method is not robust to errors in focal depth, a computationally expensive autofocus step (to compute the focal depth) must be done before reconstructing an image.

BRIEF SUMMARY OF THE DISCLOSURE

The present disclosure describes a method for counting sparse objects in recorded holograms. Existing methods for counting objects in recorded holograms use a two-step process, where holograms are first reconstructed, and then objects in the reconstructed images are counted. The presently-disclosed method jointly reconstructs and counts objects in the recorded hologram. This is done by assuming a sparse convolutional model for the objects being imaged—the optical wavefront at the image plane is modeled as the convolution of learned object templates with sparse coefficients. The propagation of this wavefront from the image plane to the sensor can then be approximated via convolution with the wide angular spectrum transfer function. The recorded hologram contains the absolute value of the (complex-valued) propagated wavefront, plus we allow an additional background illumination. First, the present disclosure describes an unsupervised method for learning the complex-valued templates of the objects being imaged. Then, given these templates and knowing the distance between the object specimen and the sensor, a method is described for finding the sparse encoding for a recorded hologram, while jointly recovering the missing phase information and background illumination. Rather than first reconstructing a holographic lens-free image and then counting objects in the reconstructed image, the presently-disclosed techniques jointly reconstructs and counts objects in the recorded hologram. A priori knowledge of the distance between the sensor and the specimen being imaged is needed, however, the present method is less sensitive to errors in this distance than other methods for counting in holograms, potentially alleviating the need to perform a computationally expensive autofocus. The present method has been successfully used to count blood cells in holographic images of lysed whole blood.

DESCRIPTION OF THE DRAWINGS

For a fuller understanding of the nature and objects of the disclosure, reference should be made to the following detailed description taken in conjunction with the accompanying drawings.

DETAILED DESCRIPTION OF THE DISCLOSURE

Figure 1:
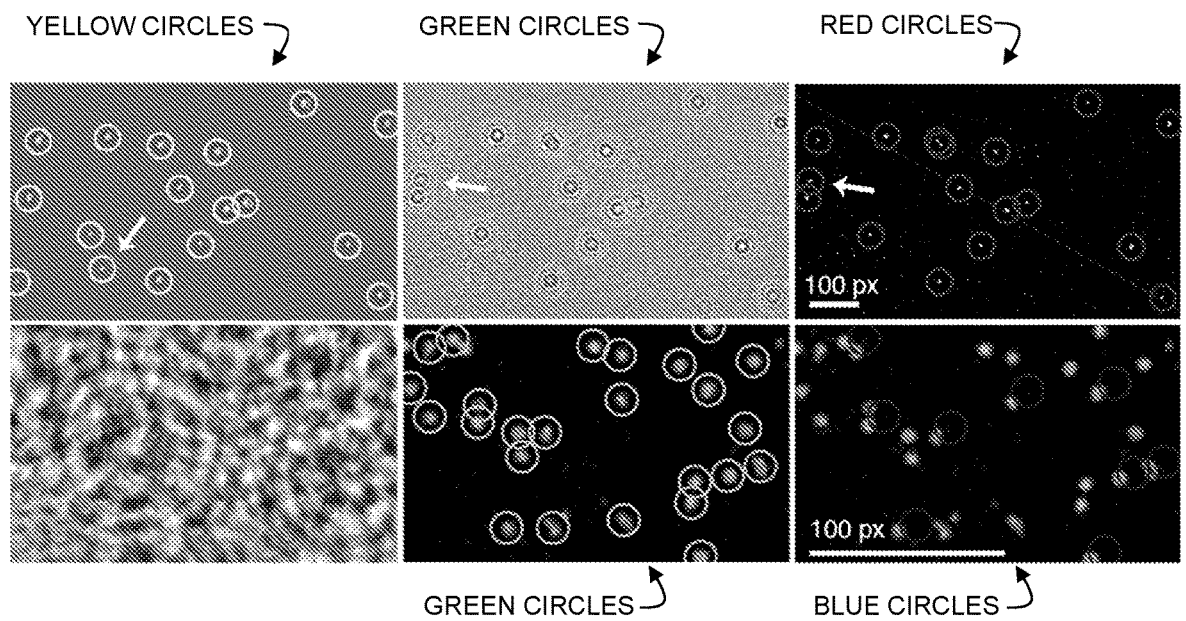
FIG. 1. (Top) Crops from a typical fluorescent image (left) and the corresponding holographic image (middle) and its SPR reconstruction (right). (Bottom) Crops from a high concentration sample's hologram (left) and its SPR reconstruction (right, middle). Yellow circles correspond to fluorescent detections, green circles to detections produced by the present method, red circles to SPR-Thresh detections and blue circles to CSC detections. Note that both the present method and CSC work directly on holograms, and the detections in the bottom (right, middle) panels are overlaid on SPR reconstructions only for visualization purposes. Arrows point out false positive and false negative detections.

The present disclosure presents a method based on convolutional sparse coding for detecting objects directly from holograms, by modeling both the object plane and the diffraction process responsible for producing the holographic images. This is the first method for object detection in holograms that accounts for the non-linear diffraction process, thereby enabling us to count cells directly from holograms, even for high-cell-concentration samples. The presently-disclosed techniques are robust to large errors in focal depth, potentially alleviating the need for auto-focusing if the approximate focal depth in the experimental setup is known. We also provide a flexible, unsupervised method for training convolutional templates of the objects being imaged, so that images acquired at any focal depth, even one different than the focal depth of the test images, can be used during training. Finally, we demonstrate that the presently-disclosed method can accurately detect white blood cells (WBCs) in holographic images.

In a first aspect, the present disclosure may be embodied as a method 100 for detecting objects in a holographic image. The method 100 includes obtaining 103 a holographic image (H). The holographic image has one or more objects depicted therein. For example, the holographic image may be a holographic image of a specimen, such as a biological specimen. In a particular example, the specimen may be in a chamber, such as a flow chamber. The holographic image has a focal depth (z). In some embodiments, only an approximated focal depth may be known as further described below under the heading "Further Description."

A set of object templates {d} is obtained 106. The object templates represent objects to be detected in the holographic image—e.g., each object to be detected can be well-approximated by a single object template of the set of templates. The set of object templates includes a number (j) of object templates.

The method 100 includes detecting 109 one or more objects in the holographic image. The one or more objects are detected 109 using the set of object templates by iteratively computing a phase ($\theta$) of the optical wavefront at the hologram plane, background illumination ($\mu$), and encoding coefficients (A) for the set of object templates, until converged. In a particular example, the encoding coefficients and background illumination may be initialized 115 (e.g., assigned pre-determined values, etc.) These parameters (background illumination and encoding coefficients) may be used, along with the focal depth, to compute 118 a phase ($\theta$) of the optical wavefront at the hologram plane. For example, the phase of the optical wavefront may be computed 118 by computing a wavefront diffraction over the focal depth. In a particular example, the phase angle ($\theta$) is computed according to $\theta=\text{angle}(T(z)\star\Sigma_j d_j \star A_j+\mu 11^T)$, where $T(z)$ is the wide angular spectrum transfer function as further described below under the heading "Further Description."

The computed phase may then be used to compute 121 (e.g., update) the background illumination. In a particular example, background illumination ($\mu$) is computed according to $\mu=\text{mean}(H\cdot^{i\theta}-T(z)\star\Sigma_j d_j\star A_j)$.

The phase and background illumination are used to compute 124 (e.g., update) the encoding coefficients. In some embodiments, computing the encoding coefficients comprises computing a differentiable function $$h(A) = \frac{1}{2}\left\|H\circ e^{i\theta} - T(z)\star\sum_j d_j\star A_j - \mu 11^T\right\|_F^2;$$

and computing a proximal operator of a non-differentiable function $g(a)=\lambda\Sigma_j\|A_j\|_0+I_C(A)$, where $I_C(A)$ is an indicator function that is equal to zero if $A\in C:=\{A:\|A\|_{0,\infty}\leq 1\}$ and equal to infinity otherwise. These parameters and the process is further described below under the heading "Further Description." For example, the differential function may be computed using an approximate proximal gradient step method with a step size p, where p may be pre-determined. More particularly, the differentiable function may be computed according to $A_j^+=A_j+\rho d_j\odot(\overline{T(z)}\star(H\cdot e^{i\theta}-\mu 11^T)-\Sigma_l d_l\star A_l)$. In some embodiments, the non-differentiable function is computed by composing a non-maximal suppression operator $M_m(\ )$ with a non-negative hard-thresholding operator $H(A)$, according to $A=M_m(H_{\lambda\rho}^+(A^+))$.

In some embodiments, a number (N) of objects in the holographic image may be determined 112.

In another aspect, the present disclosure may be embodied as a system for detecting object in a specimen. The system 10 has a chamber 18 for holding at least a portion of the specimen. A lens-free image sensor 12 is positioned for obtaining a holographic image of the portion of the specimen in the chamber 18. The sensor 12 may be, for example, an active pixel sensor, a CCD, or a CMOS active pixel sensor. A processor 14 is in communication with the image sensor 12—e.g., to receive holographic images captured by the image sensor. In some embodiments the system 10 also includes a coherent light source 16. The processor 20 is programmed to perform any of the methods described herein. For example, the processor 20 may be programmed to: obtain, from the image sensor 12, a holographic image (H) having one or more objects depicted therein and a focal depth (z) of the holographic image; obtain (for example, from a storage medium) a set of object templates {d} representing objects to be detected in the holographic image, wherein the set includes a known number (j) of object templates; and detect one or more objects in the holographic image using the set of object templates by iteratively computing a phase ($\theta$) of the optical wavefront at the hologram plane, background illumination (μ), and encoding coefficients (A) for the set of object templates, until converged.

The processor 20 may be in communication with and/or include a memory. The memory can be, for example, a random-access memory (RAM) (e.g., a dynamic RAM, a static RAM), a flash memory, a removable memory, and/or so forth. In some instances, instructions associated with performing the operations described herein (e.g., operate an image sensor, detect objects in an image) can be stored within the memory and/or a storage medium (which, in some embodiments, includes a database in which the instructions are stored) and the instructions are executed at the processor.

In some instances, the processor includes one or more modules and/or components. Each module/component executed by the processor can be any combination of hardware-based module/component (e.g., a field-programmable gate array (FPGA), an application specific integrated circuit (ASIC), a digital signal processor (DSP)), software-based module (e.g., a module of computer code stored in the memory and/or in the database, and/or executed at the processor), and/or a combination of hardware- and software-based modules. Each module/component executed by the processor is capable of performing one or more specific functions/operations as described herein. In some instances, the modules/components included and executed in the processor can be, for example, a process, application, virtual machine, and/or some other hardware or software module/component. The processor can be any suitable processor configured to run and/or execute those modules/components. The processor can be any suitable processing device configured to run and/or execute a set of instructions or code. For example, the processor can be a general purpose processor, a central processing unit (CPU), an accelerated processing unit (APU), a field-programmable gate array (FPGA), an application specific integrated circuit (ASIC), a digital signal processor (DSP), and/or the like.

In another aspect, the present disclosure may be embodied as a non-transitory computer-readable medium having stored thereon a computer program for instructing a computer to perform any of the methods described herein. For example, the non-transitory medium may have instructions for obtaining (for example, from an image sensor), a holographic image (H) having one or more objects depicted therein and a focal depth (z) of the holographic image; obtaining (for example, from a storage medium) a set of object templates {d} representing objects to be detected in the holographic image, wherein the set includes a known number (j) of object templates; and detecting one or more objects in the holographic image using the set of object templates by iteratively computing a phase (θ) of the optical wavefront at the hologram plane, background illumination (μ), and encoding coefficients (A) for the set of object templates, until converged.

Some instances described herein relate to a computer storage product with a non-transitory computer-readable medium (which can also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other instances described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, instances may be implemented using Java, C++, .NET, or other programming languages (e.g., object-oriented programming languages) and development tools. Additional examples of computer code include, but are not limited to, control signals, encrypted code, and compressed code.

In an exemplary application, the methods or systems of the present disclosure may be used to detect and/or count objects within a biological specimen. For example, an embodiment of the system may be used to count red blood cells and/or white blood cells in whole blood. In such an embodiment, the object template(s) may be representations of red blood cells and/or white blood cells in one or more orientations. In some embodiments, the biological specimen may be processed before use with the presently-disclosed techniques.

FURTHER DESCRIPTION

Problem Formulation

We assume that the specimen in the object plane includes N objects, such as cells, that are similar in appearance, so that the optical wavefront at the object plane, $I \in \mathbb{C}^{M \times M}$, can be expressed as the convolution of K object templates, $\{d_j \in \mathbb{C}^{M \times M}\}_{j=1}^{K}$, with sparse coefficients $\{A_j \in \mathbb{C}^{M \times M}\}_{j=1}^{K}$ (to simplify notation, we assume images and templates are square, however this need not be the case and the present disclosure can be applied to, and includes within its scope, other shapes). We assume each object can be well-approximated by a single template, so that if $I \approx \Sigma_j d_j \star A_j$, where $\star$ denotes convolution, the locations of the objects resembling the $j^{th}$ template will be given by the support of $A_j$, and the number of objects in the image will be equal to the cardinality of the coefficients' support, $N = \Sigma_j \|A_j\|_0$.

A hologram $H \in \mathbb{R}^{M \times M}$ records the magnitude of the complex-valued optical wavefront that is formed when the wavefront I in the object plane propagates a distance z to the hologram plane via diffraction. The diffraction process over depth z can be modeled for light with wavenumber k by convolution with the wide angular spectrum transfer function, T(z), whose Fourier transform at frequencies ($k_x$, $k_y$) is defined as:

$$F[T(z)](k_x, k_y) = \exp(iz\sqrt{k^2 - k_x^2 - k_y^2}). \quad (1)$$

By combining the model for the wavefront at the object plane with the model for the diffraction process, we can express the holographic image as:

$$H \approx \left| T(z) \star \sum_j d_j \star A_j + \mu 11^T \right|, \quad (2)$$

where $\mu$ accounts for a constant background illumination in the hologram plane.

Convolutional Sparse Coding with Phase Recovery

Assume for now that the templates are known. Given a hologram, we would like to find the locations of all objects in the hologram by finding the support of the encodings $A \in \mathbb{C}^{M \times M \times K}$. As a byproduct, we must also find the background $\mu$ and the (not recorded) phase $\theta$ of the complex wavefront at the hologram plane. Specifically, Eqn. (2) can also be expressed as $H \cdot e^{i\theta} \approx T(z) \star \Sigma_j d_j \star A_j + \mu 11^T$, where $\cdot$ denotes element-wise multiplication, the exponential is applied element-wise, and $\theta \in \mathbb{R}^{M \times M}$ is the recovered phase of the hologram. We can then formulate the problem of convolutional sparse coding with phase recovery as:

$$\min_{A,\theta,\mu} F(A, \theta, \mu; \{d\}, H, z) \quad \text{s.t.} \quad \|A\|_{0,\infty} \leq 1 \quad (3)$$

$$F(A, \theta, \mu; \{d\}, H, z) = \frac{1}{2} \left\| H \circ e^{i\theta} - T(z) \star \sum_j d_j \star A_j - \mu 11^T \right\|_F^2 + \lambda \sum_j \|A_j\|_0.$$

We account for prior knowledge that objects in the image are sparse by adding regularization on the $\ell_0$ pseudo-norm of the coefficients, where the parameter $\lambda$ controls the sparsity of the encoding. To capture the fact that we would like the sparsest possible representation for each object in the image, i.e., each object should be approximated by (at most) a single template, we add the additional constraint on the $\ell_{0,\infty}$ pseudo-norm of the coefficients. The $\ell_{0,\infty}$ pseudo-norm promotes sparsity for each patch in I, the wavefront at the object plane, and is defined as $$\|A\|_{0,\infty} = \max_{i,j} \left\| P_{i,j}^m A \right\|_0,$$

where $P_{i,j}^m$ extracts a patch of size $(2m-1) \times (2m-1) \times K$ from A. This patch contains all pixels in the encoding that contribute to the m×m patch in I centered at $I_{i,j}$.

an approximate proximal gradient descent step is used to update the coefficients according to Lines 7 and 8, explained below.

To update the coefficients, the objective is split into a differentiable function $$h(A) = \frac{1}{2} \left\| H \circ e^{i\theta} - T(z) \star \sum_j d_j \star A_j - \mu 11^T \right\|_F^2,$$

and a non-differentiable function $g(A) = \lambda \Sigma_j \|A_j\|_0 + I_C(A)$, where $I_C(A)$ is the indicator function that is equal to zero if $A \in C = \{A: \|A\|_{0,\infty} \leq 1\}$ and equal to infinity otherwise. The update for A involves computing a gradient step for h(A), followed by a proximal operator for g(A). In Line 7, the gradient step is computed, where $\odot$ denotes correlation. Note that we utilize the fact that convolution with the transfer function is unitary, so $\|H \cdot e^{i\theta} - T(z) \star E_j - dj \star A_j - \mu 11^T\|_F^2 = \|\overline{T(z)} \star (H \cdot e^{i\theta} - \mu 11^T - \Sigma_j dj \star A_j\|_F^2$.

Next, the proximal operator for g is approximated, which is defined as $$\text{prox}_g(A) = \arg\min_Y \frac{1}{2} \|Y - A\|_F^2 + \lambda \sum_j \|Y_j\|_0 \quad \text{s.t.} \quad \|Y\|_{0,\infty} \leq 1. \quad (4)$$

Without the $\ell_{0,\infty}$ constraint, the proximal operator in Eqn. (4) would be equal to the complex hard-thresholding operator, $$[H_\lambda(A)]_{i,j,k} = \begin{cases} [A]_{i,j,k} & \text{if } |[A]|_{i,j,k} > \sqrt{2\lambda} \\ 0 & \text{else} \end{cases}, \quad (5)$$

and without the $\ell_0$ term, the proximal operator could be approximated by the non-maximal suppression operator, $$[M_m(A)]_{i,j,k} = \begin{cases} [A]_{i,j,k} & \text{if } \max_{i,j,k} |P_{i,j}^m A| = |[A]|_{i,j,k} \\ 0 & \text{else} \end{cases}. \quad (6)$$

This can be seen by noticing that if A encodes an image of non-overlapping objects of size m, at most a single object

---

PROCEDURE 1 (Convolutional sparse coding with phase recovery)

1: Input focal depth z and templates {d}, and set m to equal the size of the templates.
2: Initialize A and $\mu$.
3: while Not converged do
4:     $\theta$ = angle(T(z) * $\Sigma_j$ $d_j$ * $A_j$ + $\mu 11^T$)                                                              ▷ Update phase
5:     $\mu$ = mean (H $\circ$ $e^{i\theta}$ – T(z) * $\Sigma_j$ $d_j$ * $A_j$)                                                        ▷ Update background
6:     Choose step size $\rho$                                       ▷ Via backtracking line search, or via Lipschitz constant
7:     $A_j^+ = A_j + \rho d_j \odot \overline{T(z)} * (H \circ e^{i\theta} - \mu 11^T) - \Sigma_l d_l * A_l)$                  ▷ Compute for each j
8:     A = $M_m$ ($H_{\lambda \rho}$ ($A^+$))                                                             ▷ Update coefficients
9:     $N = \Sigma_j \|A_j\|_0, I = \Sigma_j d_j * A_j$                                           ▷ Number objects detected, reconstructed image

---

Note that jointly solving for the phase and encoding (and background) in Eqn. (3) accounts for the fact that signals in the object plane combine non-linearly to form the recorded hologram. A naive application of convolutional sparse coding to the hologram would not account for the fact that the hologram records only the magnitude of a complex wavefront. To minimize Eqn. (3), a hybrid algorithm is used, summarized in Procedure 1 (depicted above). Alternating minimization is used to update the phase and background with the closed form expressions given in Lines 4 and 5, and will be located in any given m×m patch in the image. The non-maximal suppression operator suppresses everything other than the maximum element in A that contributes to a given patch in the image. Therefore, for images of non-overlapping objects, the proximal operator of the $\ell_{0,\infty}$ term will almost always be equal to the non-maximal suppression operator. Finally, we observe that the proximal operator in Eqn. (4) is in general a hard problem to solve. We conclude that the proximal operator can be computed by composing the non-maximal suppression operator with the complex hard-thresholding operator, as in Line 8.

Learning Convolutional Templates. During training, we would like to learn the object templates, given a collection of S holograms, $\{H^i\}_{i=1}^S$, obtained at any (known) focal depth(s) $\{z^i\}_{i=1}^S$. This is done by minimizing the objective in Eqn. (3), but also with respect to the templates $\{d_j\}_{j=1}^K$, $$\min_{\{A^i\},\{\theta^i\},\{\mu^i\},\{d\}} \sum_i F(A^i, \theta^i, \mu^i, \{d\}; H^i, z^i) \text{ s.t. } \|A^i\|_{0,\infty} \leq 1, \|d_j\|_F = 1, \quad (7)$$

where $A^i$, $\theta^i$, and $\mu^i$ denote the respective coefficients, phase and background corresponding to the $i^{th}$ hologram. As is common in dictionary learning, we constrain the norm of the templates to make the problem well-posed. We use an alternating minimization algorithm: Given the templates, we update the coefficients, phase and background for each hologram according to Procedure 1. Given the coefficients, phase and background for each hologram, we update the templates using the convolutional dictionary learning method described in PCT/US2018/036913, incorporated herein by this reference (the unitary property of T(z) enables this). Because templates are being learned in the object plane, rather than hologram plane, training and test images need not be acquired at the same focal depth. Also, templates in the object plane are more compact than those in the hologram plane, increasing the efficiency of our method over standard convolutional sparse coding applied directly to holograms.

EXPERIMENTS AND RESULTS

We applied our method to the task of detecting WBCs in holograms using three types of data: (1) To learn WBC templates, we acquired holograms of purified WBCs, meaning WBCs were experimentally extracted from a blood sample containing also red blood cells (RBCs), and then imaged at a focal depth of about 1000 μm. (2) To verify our ability to detect WBCs, we designed a tandem-image setup that allowed us to acquire for a single specimen both fluorescent and holographic images with a focal depth of about 400 μm. We used this setup to image blood samples diluted in a lysis buffer, which formed a mixture of WBCs and debris from lysed RBCs. The WBCs were also labeled with a fluorescent dye, so that they would fluoresce while the RBC debris would not. The sample was flown through a microfluidic channel, and the flow was repeatedly stopped to obtain consecutive holographic and fluorescent images. (3) We also obtained holograms of a lysed blood sample with high WBC concentration.

Fluorescent Image Processing and Alignment. We denoised the fluorescent images, resulting in images such as the one shown in FIG. 1 (top left). Next, cells were detected in the denoised images via convolutional sparse coding, and cells were also detected in the holograms via either the presently-disclosed method or one of the baseline methods described below. Correspondences between detections in the two images were established using an affine registration procedure that alternated between estimating the affine transformation given the correspondences, and vice versa. There was still some offset between the sets of detections after alignment, because cells could move slightly between acquiring the fluorescent and holographic images, so we matched points in the two sets of (approximately) aligned detections to each other, where a match was permitted only when points were within a given radius of detection of each other.

Baseline Methods. We compare our method to two baseline methods. (1) The first method counts cells directly from holograms using a standard convolutional sparse coding (CSC) method. Convolutional templates in the hologram plane were trained using one image from the test dataset. Ideally, the training data should come from a separate dataset, such as the purified WBC dataset, but a limitation of this method is that the training and test data must be obtained at the same focal depth. (2) The second baseline method is a two-step process, where we first reconstructed the images using the sparse phase recovery (SPR) method and then thresholded the magnitude of the reconstructed image intensity and filtered the detections based on size (SPR-Thresh). Hyper-parameters for all methods were chosen empirically.

Cell Detection Results. After training the convolutional templates, we tested the ability of the presently-disclosed method, CSC, and SPR-Thresh to detect WBCs on tandem image data obtained from three blood samples, with 49 to 99 image pairs per sample. Note that the templates for the present method were trained on the purified WBC dataset, which was acquired at a focal depth of about 500 μm greater than that of the test data. Because the present method learns templates in the object plane, the focal depth during training and testing need not be the same. For each method and for all images, we performed the alignment and matching described above. Frames with fewer than 20 fluorescent detections were discarded, because the automatic alignment is prone to fail without enough good matches. Sample detections from the various methods, after alignment, are shown in FIG. 1 (top).

Figure 2:
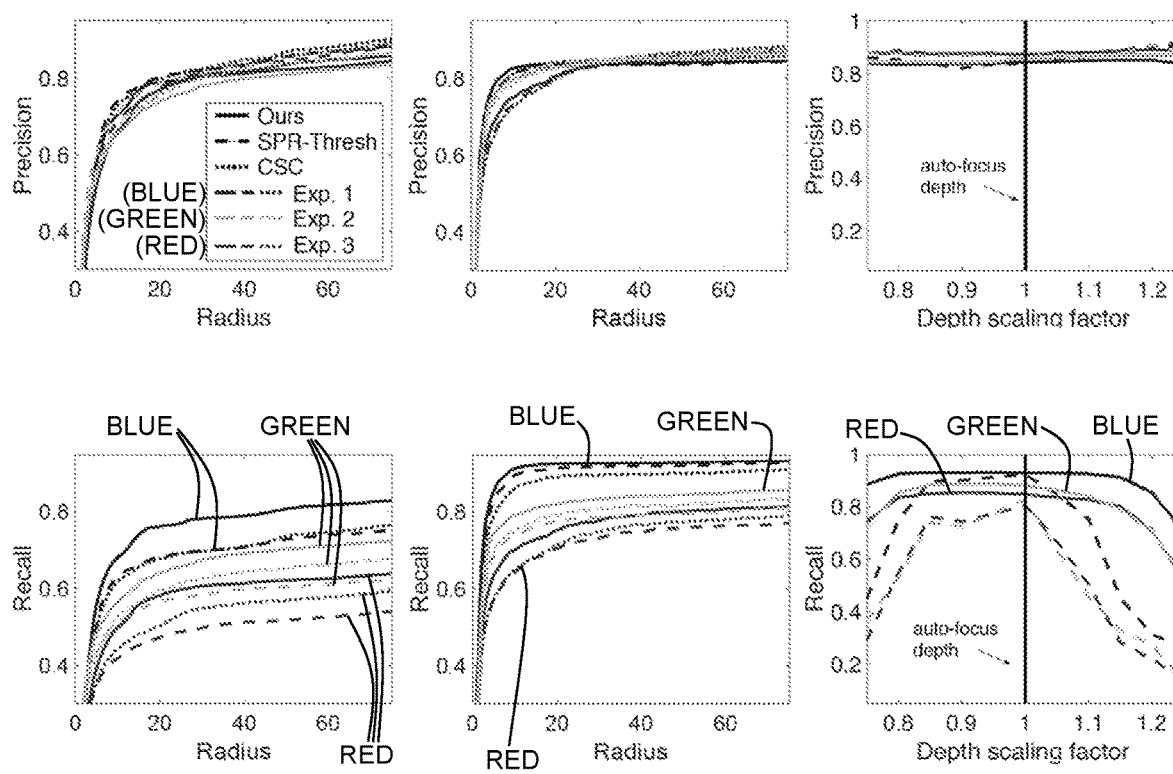
FIG. 2. Detection results are shown for our method, SPR-Thresh, and CSC. Precision (top) and recall (bottom) plots are shown for three different experiments as a function of detection radius (left, middle) and depth (right). Depth scaling factor s means methods used $z=s \times z_{GT}$, where $z_{GT}$ is the correct focal distance. Plots in the middle and right columns were obtained after filtering out stationary detections.
Figure 3:
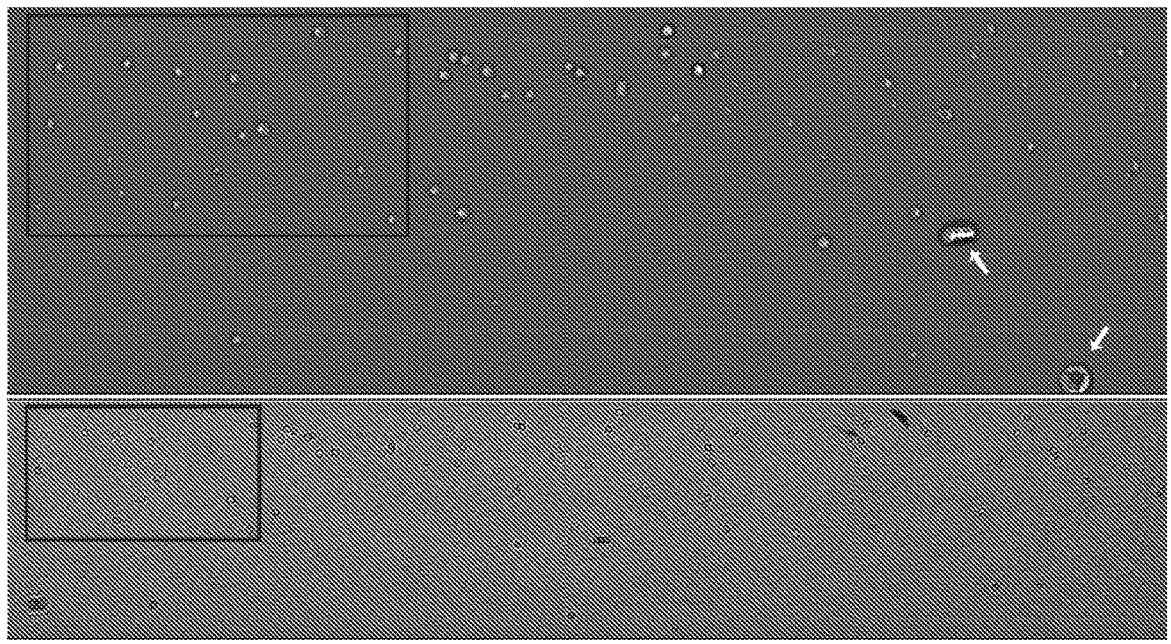
FIG. 3. A typical fluorescent image (top) and the corresponding holographic image (bottom) are shown. The rectangles correspond to the regions shown in FIG. 1 (top left, middle). Arrows point out stationary fluorescent objects.
Figure 4:
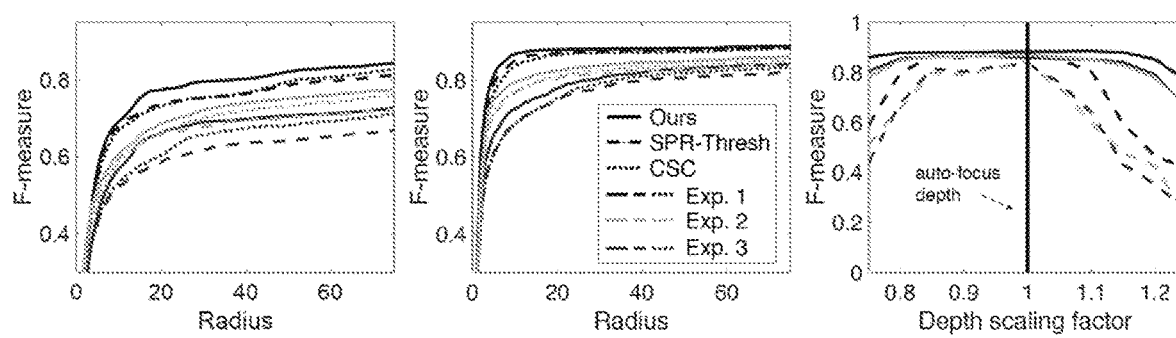
FIG. 4. Detection results are shown for the presently-disclosed method, SPR-Thresh, and CSC. F-measure plots are shown for three different experiments as a function of detection radius (left, middle) and depth (right). The f-measure is defined as 2 precision×recalll/precision+recall, and the corresponding precision and recall plots are shown in FIG. 2. Plots in the middle and right columns were obtained after filtering out stationary detections.
Figure 5:
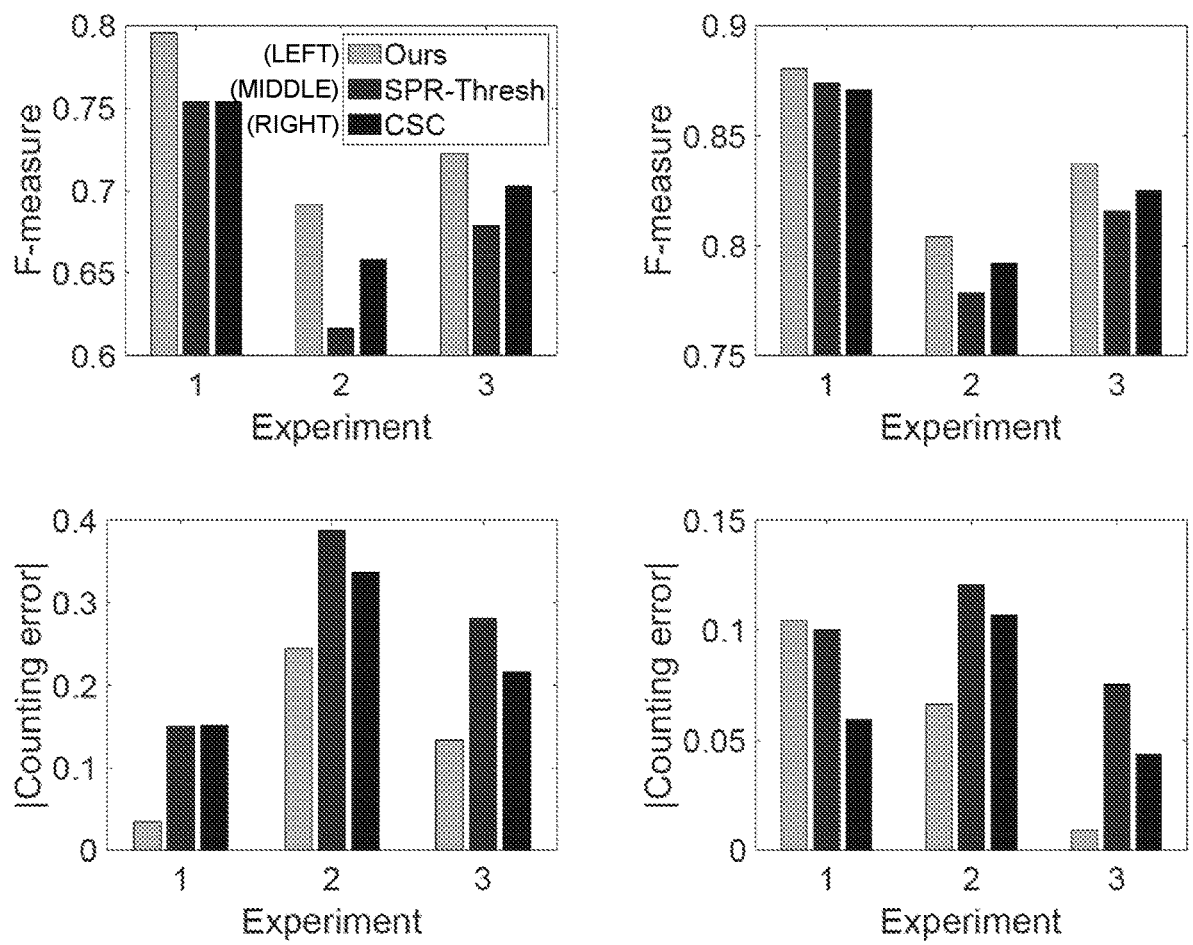
FIG. 5. Detection and counting results are shown for our method, SPR-Thresh, and CSC. F-measure (top) and absolute counting errors (bottom) are shown for three different experiments. The f-measure results were obtained at a detection radius of 30. Plots in the right columns were obtained after filtering out stationary detections.
Figure 6:
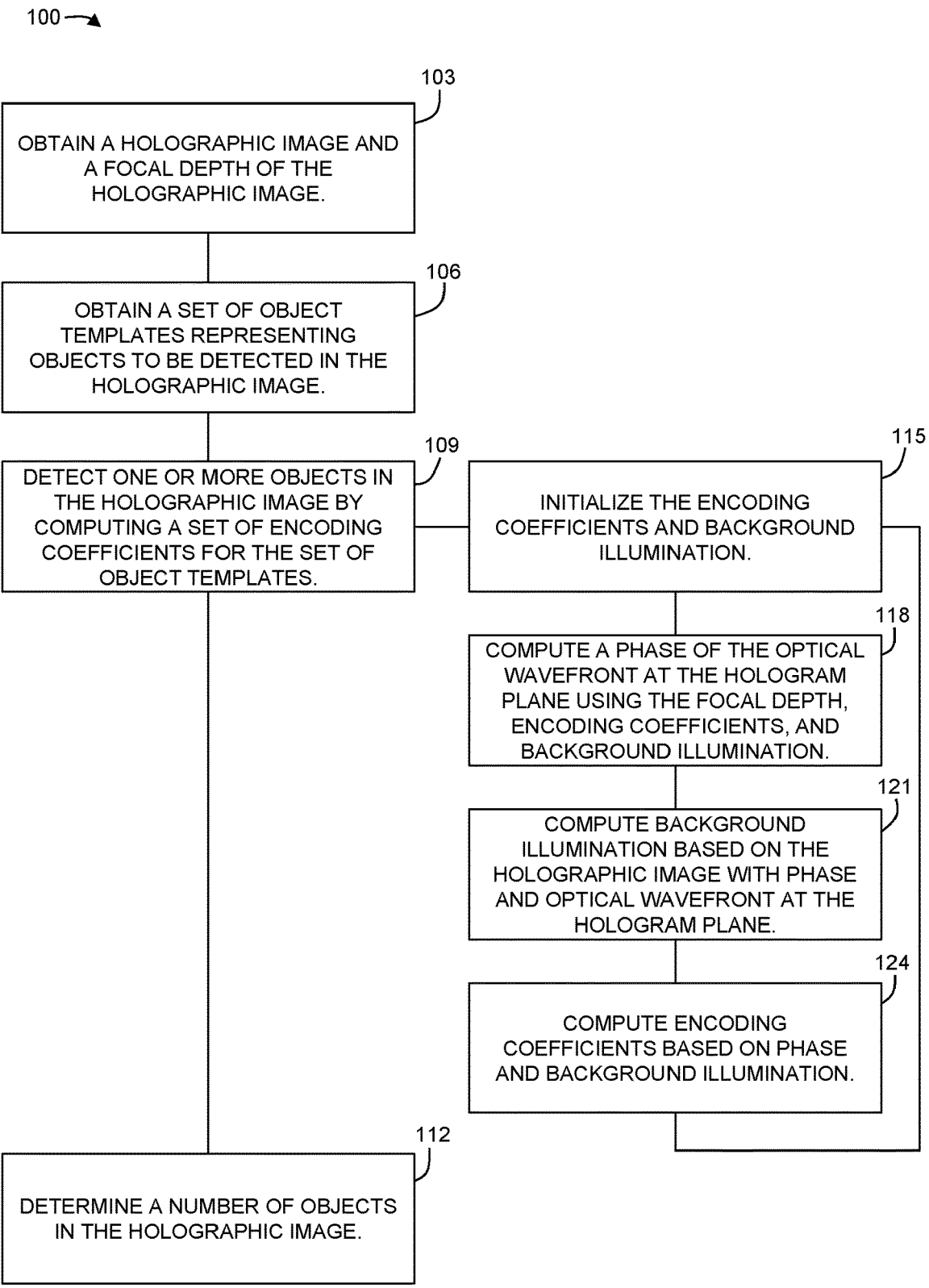
FIG. 6. A method according to an embodiment of the present disclosure.
Figure 7:
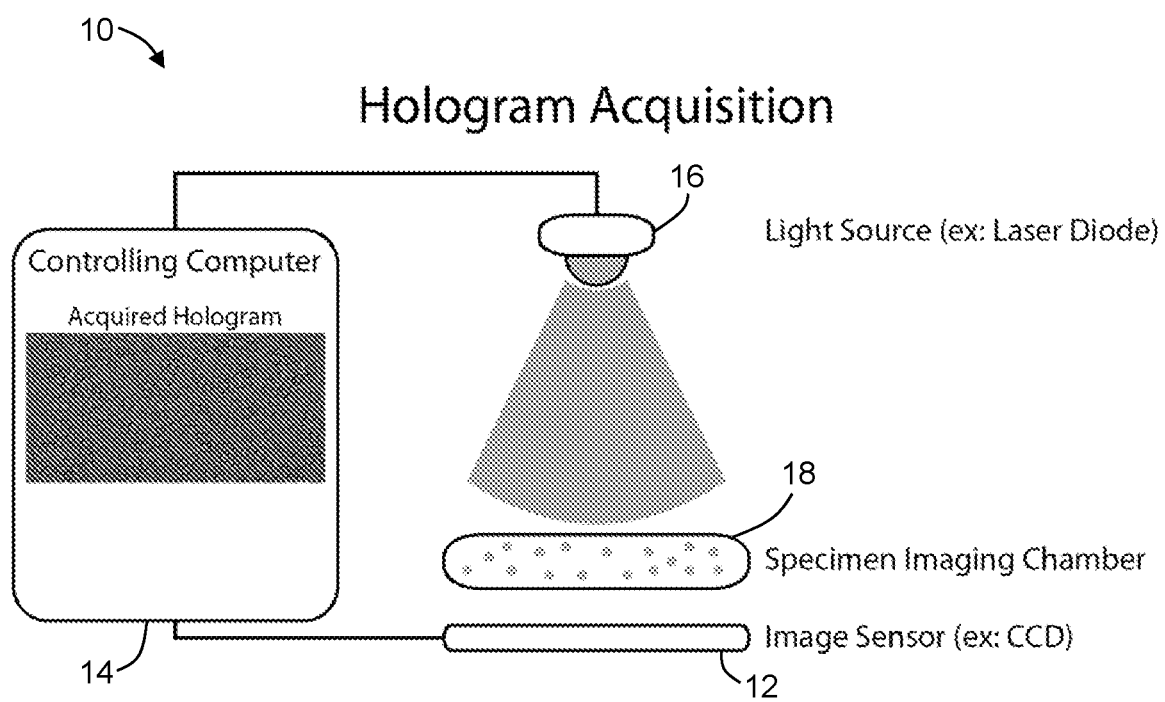
FIG. 7. A system according to another embodiment of the present disclosure.

We then computed precision and recall for each experiment and method as a function of the detection radius, shown in FIG. 2 (left). The precision is similar for all methods and experiments, suggesting there is a fixed percentage of cell-like objects that do not fluoresce but are consistently detected in the hologram, regardless of detection method. However, the recall varies significantly, with the present method always out-performing others, suggesting that the present method is best-suited to locate hard-to-detect cells. As with any experimental setup, our tandem image setup contain sources of error: Not all WBCs fluoresce (due to variable expression level of proteins targeted by fluorescently-labelled antibodies), and clumps of cell debris stuck to the channel may auto-fluoresce, leading to false fluorescent detections. To reduce error due to fluorescent debris stuck to the channel, we filtered out stationary detections. As shown in FIG. 2 (middle), all methods improved significantly, with the present method still showing the best performance.

Another advantage of the present method is its robustness to errors in focal depth, compared to SPR-Thresh. As the focal depth at which images are reconstructed fluctuates away from the true distance between the sample and sensor, the thresholding method is unable to detect cells in the reconstruction, as evident from the recall plot in FIG. 2 (bottom right). In contrast, the present method's performance remains almost constant over a range of about 100 μm. This can be an important advantage of the present method, as images acquired by lens-free imaging often have a large field-of-view, so small alignment errors in the experimental setup can result in a large difference in focal depth across the image. Furthermore, the computationallyheavy autofocus preprocessing step may be eliminated when the approximate focal depth of the experimental setup is known.

Finally, the present technique was qualitatively analyzed to determine the ability to detect cells in high-concentration blood samples. FIG. 1 (bottom left) shows a small crop from a hologram of a high cell density sample, where the non-linear interaction of the cell signals is apparent. Because the non-linearity in the diffraction process is modeled, the presently-disclosed technique is able to detect the cells reliably in the hologram. However, CSC, which works reasonably well in the low-density regime, is unable to detect cells in the high-concentration sample, as shown in FIG. 1 (bottom middle, right).

Although the present disclosure has been described with respect to one or more particular embodiments, it will be understood that other embodiments of the present disclosure may be made without departing from the spirit and scope of the present disclosure. Hence, the present disclosure is deemed limited only by the appended claims and the reasonable interpretation thereof.

What is claimed is:

1. A method for detecting objects in a holographic image, comprising:
   obtaining a holographic image (H) having one or more objects depicted therein and a focal depth (z) of the holographic image;
   obtaining a set of object templates {d} representing objects to be detected in the holographic image, wherein the set includes a known number (j) of object templates; and
   detecting one or more objects in the holographic image using the set of object templates by iteratively computing a phase ($\theta$) of the optical wavefront at the hologram plane, background illumination ($\mu$), and encoding coefficients (A) for the set of object templates, until converged.

2. The method of claim 1, further comprising determining, based on the one or more detected objects, a number (N) of objects in the holographic image.

3. The method of claim 1, wherein the step of detecting one or more objects comprises:
   initializing the encoding coefficients and background illumination;
   computing the phase of the optical wavefront at the hologram plane using the focal depth, encoding coefficients and background illumination;
   computing background illumination based on the holographic image with phase and the optical wavefront at the hologram plane;
   computing encoding coefficients based on phase and background illumination; and
   repeating the computational steps until convergence of the respective value for each of the phase, background, and encoding coefficients.

4. The method of claim 3, wherein computing the phase of the optical wavefront comprises computing the wavefront diffraction over the focal depth.

5. The method of claim 3, wherein the background illumination is computed according to: $\mu$=mean $(H \cdot e^{i\theta} - T(z) \star \Sigma_j d_j \star A_j)$, wherein T(z) is a wide angular spectrum transfer function.

6. The method of claim 3, wherein computing the encoding coefficients comprises:
   computing a differentiable function $$h(A) = \frac{1}{2}\left\|H \circ e^{i\theta} - T(z) \star \sum_j d_j \star A_j - \mu 11^T\right\|_F^2;$$

and
   computing a proximal operator of a non-differentiable function $g(a)=\lambda\Sigma_j\|A_j\|_{0,\infty}+I_C(A)$, where $I_C(A)$ is an indicator function that is equal to zero if $A \in C=\{A: \|A\|_{0,\infty} \leq 1\}$ and equal to infinity otherwise.

7. The method of claim 6, where the differential function is computed using an approximate proximal gradient step method with a step size $\rho$.

8. The method of claim 7, wherein p is pre-determined.

9. The method of claim 7, wherein the differentiable function is computed according to $A_j^+=A_j+\rho d_j \odot (\overline{T(z)} \star (H \cdot e_{i\theta} - \mu 11^T) - \Sigma_i d_i \star A_i)$.

10. The method of claim 6, wherein the non-differentiable function is computed by composing a non-maximal suppression operator $M_m(\ )$ with a non-negative hard-thresholding operator H(A), according to $A=M_m(H_{\lambda\rho}^+(A^+))$.

11. A system for detecting objects in a specimen, the system comprising:
    a chamber for holding at least a portion of the specimen;
    a lens-free image sensor for obtaining a holographic image of the portion of the specimen in the chamber; and
    a processor in communication with the image sensor, the processor programmed to perform the method according to claim 1.

12. The system of claim 11, further comprising a coherent light source.

13. The system of claim 11, wherein the image sensor is an active pixel sensor, a CCD, or a CMOS active pixel sensor.

14. A non-transitory computer-readable medium having stored thereon a computer program for instructing a computer to perform the method according to claim 1.

* * * * *